US012492598B2

(12) United States Patent
Palazzolo et al.

(10) Patent No.: US 12,492,598 B2
(45) Date of Patent: Dec. 9, 2025

(54) METHOD AND SYSTEM FOR REDUCING FRICTION IN RADIAL DRILLING AND JET DRILLING OPERATIONS

(71) Applicant: RADJET SERVICES US, INC., Austin, TX (US)

(72) Inventors: Alan Palazzolo, College Station, TX (US); Sam Noynaert, College Station, TX (US); Srivignesh Srinivasan, College Station, TX (US); Baik Jin Kim, College Station, TX (US); Randall Tucker, College Station, TX (US)

( * ) Notice: Subject to any disclaimer, the term of this patent is extended or adjusted under 35 U.S.C. 154(b) by 0 days.

(21) Appl. No.: 18/569,828

(22) PCT Filed: Jun. 1, 2023

(86) PCT No.: PCT/US2023/067739

§ 371 (c)(1),
(2) Date: Dec. 13, 2023

(87) PCT Pub. No.: WO2023/235784

PCT Pub. Date: Dec. 7, 2023

(65) Prior Publication Data

US 2024/0271490 A1 Aug. 15, 2024

(51) Int. Cl.
*E21B 7/06* (2006.01)
*B05D 1/28* (2006.01)
(Continued)

(52) U.S. Cl.
CPC ................ *E21B 7/061* (2013.01); *B05D 1/28* (2013.01); *E21B 7/04* (2013.01); *E21B 7/18* (2013.01);
(Continued)

(58) Field of Classification Search
CPC .................................. E21B 7/061; E21B 7/18
See application file for complete search history.

(56) References Cited

U.S. PATENT DOCUMENTS 4,858,705 A 8/1989 Thiery
5,120,203 A * 6/1992 Priestly ................ E21B 43/121 92/174

(Continued)

FOREIGN PATENT DOCUMENTS

CA 2827451 A1 * 1/2013 ......... E21B 33/1208
CA 2827462 A1 * 8/2021 ......... E21B 33/1216
KR 20160146053 A * 12/2016 ........... B05D 3/0263

OTHER PUBLICATIONS

International Search Report for corresponding PCT/US2023/67739 dated Sep. 19, 2023.

(Continued)

*Primary Examiner* — Jennifer H Gay

(74) *Attorney, Agent, or Firm* — Egbert, McDaniel & Swartz, PLLC

(57) ABSTRACT

Disclosed is a method for reducing friction in a radial drilling application. The method involves coating the interior of a deflector shoe with at least one lubricant. Lubrication of the deflector shoe can be accomplished by applying a dry lubricant to the interior of the deflector shoe, allowing the dry lubricant to harden, and applying a wet lubricant over the hardened dry lubricant. The interior surface of the deflector shoe may be roughened prior to application of the lubricant. The method can further include coating a hose and/or a jet nozzle, and passing the hose and/or jet nozzle through the coated interior of the deflector shoe. The method can further include coating components of a milling cutter, and passing the components of the milling cutter through the
(Continued)

coated interior of the deflector shoe. An apparatus for reducing friction in a radial drilling application is also disclosed.

2 Claims, 6 Drawing Sheets

(51) Int. Cl.

*E21B 7/04* (2006.01)
*E21B 7/18* (2006.01)
*E21B 17/08* (2006.01)
*F01M 11/02* (2006.01)

(52) U.S. Cl.

CPC ............. *E21B 17/08* (2013.01); *F01M 11/02* (2013.01); *B05D 2254/04* (2013.01)

(56) References Cited

U.S. PATENT DOCUMENTS

| | | | | |
|---|---|---|---|---|
| 5,148,877 | A | 9/1992 | Macgregor | |
| 5,803,176 | A | 9/1998 | Blizzard et al. | |
| 6,220,372 | B1 | 4/2001 | Cherry | |
| 6,419,020 | B1 * | 7/2002 | Spingath | E21B 7/061 166/50 |
| 6,920,945 | B1 * | 7/2005 | Belew | E21B 7/061 166/298 |
| 7,669,672 | B2 | 3/2010 | Brunet et al. | |
| 9,567,820 | B2 * | 2/2017 | Pearl | E21B 7/18 |
| 2008/0110629 | A1 * | 5/2008 | Belew | E21B 10/61 166/55.1 |
| 2008/0277166 | A1 | 11/2008 | Orban et al. | |
| 2009/0242193 | A1 * | 10/2009 | Thornton | E21B 17/1085 175/325.1 |
| 2012/0205873 | A1 * | 8/2012 | Turley | E21B 43/103 277/336 |
| 2012/0228033 | A1 | 9/2012 | Mazarac | |
| 2014/0299324 | A1 * | 10/2014 | Pearl | E21B 7/18 166/55 |
| 2017/0204667 | A1 * | 7/2017 | Mccormack | E21B 29/06 |
| 2019/0144122 | A1 * | 5/2019 | Loth | B64F 5/40 427/387 |
| 2021/0108299 | A1 * | 4/2021 | Kang | E21B 17/1085 |
| 2021/0115753 | A1 * | 4/2021 | Slup | E21B 23/01 |
| 2022/0136384 | A1 * | 5/2022 | Phan | E21B 17/1085 166/250.01 |
| 2024/0093623 | A1 * | 3/2024 | Palazzolo | F01M 11/02 |
| 2024/0271490 | A1 * | 8/2024 | Palazzolo | E21B 17/08 |

OTHER PUBLICATIONS

Written Opinion of the International Searching Authority for corresponding PCT/US2023/67739 dated Sep. 19, 2023.
Official Action for U.S. Appl. No. 17/830,521, dated Aug. 3, 2023.

* cited by examiner

METHOD AND SYSTEM FOR REDUCING FRICTION IN RADIAL DRILLING AND JET DRILLING OPERATIONS

FIELD OF THE INVENTION

The present invention relates to operating downhole oil and gas well devices from the surface of the earth. More particularly, the present invention relates to deflector shoes used in downhole operations. Even more particularly, the present invention relates to reducing friction in deflector shoes.

BACKGROUND OF THE INVENTION

In the type of hydrocarbon drilling operation where a drilling tool is redirected laterally through the side of a wellbore, it is common to use a downhole device known as a "deflector shoe", which is attached to the lower end of the workstring or production tubing to "deflect" case-milling and drilling tools laterally. Where more than one lateral borehole is to be drilled from the wellbore, it is also common to reorientate the deflector device by manipulating the workstring or production tubing (hereafter generally "tubing" or "production tubing") from the surface, for example by rotating and/or lifting the tubing up and down to operate an indexing device that rotates the deflector. These methods require expensive, slow, and/or difficult-to-move machinery on the surface to lift the entire production tubing.

One such indexing deflector device is shown and described in the applicant's U.S. Pat. No. 7,669,672.

FIG. 1 schematically shows such a prior art indexing deflector assembly, which generally includes a retractable tubing anchor 22, a deflector shoe 20, an indexer tool 18, and a tube segment or connector or landing profile 17 for connecting the deflector shoe to the production tubing 14. Milling and drilling tools, for example a jetting nozzle 16*a*, are lowered into operative engagement with the deflector shoe 20 via coiled tubing string 16. Tubing 14 may also be connected directly to deflector shoe 20.

Details of such deflector assemblies are known to those skilled in the art and are not necessary for an understanding of the present invention. However, for context, the tubing anchor 22 is a device that contains slip devices that are outwardly biased to contact and "dig" into the sidewalls of the wellbore casing 12. The tubing anchor 22 is operated either mechanically by rotation of the production tubing 14 from the surface, or hydraulically by fluid pressure. The deflector shoe 20 is a tubular piece with a curving channel or passage 20*a* milled through it from its upper end, the channel entering the upper end of the deflector shoe 20 with an orientation parallel to its long axis and exiting a side of the deflector shoe perpendicular to the long axis. The shoe 20 is connected at its lower end to indexer 18 and the tubing anchor 22 and at its upper end to the production tubing 14. The indexing tool 18 is connected to the deflector shoe 20 to reorient the deflector shoe 20 in the wellbore 10 in response to a combination of up-and-down reciprocation and rotation of the production tubing 14, and thus change the radial direction in which casing-milling and borehole-drilling devices such as 16*a* are redirected through the deflector shoe 20 to engage the wellbore casing 12 and the surrounding formation 11.

The applicant developed a downhole tubing shift tool and method, as shown in U.S. Pat. No. 8,813,856 which overcomes problems of the prior art related to the reorientation of the deflector device, reducing the time, expense and difficulty associated with the reorientation. This is accomplished by utilizing hydraulic pressure and the tool to rotate the diverter shoe via the indexer.

Various patents have been issued in the past relating to radial drilling and jet drilling applications, including a number of patents which are owned by the present applicant. For example, U.S. Pat. No. 9,145,738, which issued on Sep. 29, 2015, describes a method and apparatus for forming a borehole. In particular, the patent discloses a jetting nozzle for forming boreholes or for cleaning out other tubular formations which has a vibration-inducing mechanism that maximizes penetration rates and expands the diameter of the boreholes. The vibration-inducing mechanism can be an internal turbine responsive to the flow of pressurized jetting fluid through the nozzle. The nozzle has forward openings defining a voraxial spray pattern for the forward-directed jetting portion of the fluid exiting the nozzle. The nozzle can also have a pointed end that is adapted to penetrate the formation. The vibration also reduces friction between the fluid supply hose and the borehole being jetted through the formation by the nozzle. A system for forming boreholes with the jetting nozzle and a method of forming boreholes is also disclosed.

U.S. Pat. No. 8,590,637, which issued on Nov. 26, 2013, describes an apparatus and method for controlling the feed-in speed of a high-pressure hose in jet drilling operations. Specifically, the patent discloses a jetting hose which is conveyed downhole retracted on the end of a tubing string (coiled tubing) for jetting lateral boreholes from a main wellbore. The apparatus allows the operator to sense the speed at which the jetting hose and nozzle are penetrating the formation and adjust the coiled tubing string feed-in rate accordingly, optimizing both the direction and length of the lateral borehole relative to the main wellbore.

The first step in the two-step process of radial jet drilling is the casing milling process which utilizes the system as described hereinabove and in FIG. 1, or in improvements thereon. This process is critical to ensure that the nozzle of the jet drilling system can exit the casing to start cutting the formation.

The second step in the radial jet drilling process is the water jet cutting or jetting process. In this step, an assembly of hose and jetting nozzles goes through the deflector shoe and changes its direction to the horizontal before exiting the casing and cutting through the formation materials.

In FIG. 2, it can be seen how a jetting nozzle 22 connected to the flexible hose 24 extends through the deflector shoe 20. As the jetting nozzle 22 is pushed through the interior of the deflector shoe 20, it necessarily comes in contact with the walls of the deflector shoe 20. As shown in FIG. 2, the flexible hose is connected to a plurality of subs 28 and ultimately to a coiled tubing string 26 into the casing 12.

FIG. 3 illustrates a prior art example of a thumper nozzle subassembly of the type which may be used in radial jet drilling operations. As can be seen in FIG. 3, the thumper nozzle subassembly 30 includes the flexible hose 24, which is connected to the hose crimp 32, a turbine jet sub 34, a rotor jet sub 36, and ultimately, the jetting nozzle 22. A number of different types of jetting nozzles and assemblies can be utilized in radial jet drilling operations, which result in varying amounts of friction between the respective assembly and the interior walls of the deflector shoe.

Ultimately, friction between components being moved through the deflector shoe results in reduced useful life of such components, and increased power requirements of motors and pumps utilized in these operations.

As such, it is an object of the present invention to provide a method which reduces friction in radial drilling and jet drilling applications.

It is another object of the present invention to provide a method with reduces power requirements in radial jet drilling and jet drilling applications.

It is another object of the present invention to provide a method which extends the useful life of components used in radial drilling and jet drilling applications.

It is another object of the present invention to provide a method which reduces costs and time associated with radial drilling and jet drilling applicant applications.

It is yet another object of the present invention to provide a method for reducing friction in radial drilling and jet drilling applications which is relatively simple and inexpensive.

Finally, it is an object of the present invention to provide a method for reducing friction in radial drilling and jet drilling applications which can be applied on site.

These and other objects and advantages of the present invention will become apparent from a reading of the attached specification and appended claims.

BRIEF SUMMARY OF THE INVENTION

The present invention is a method for reducing friction in radial drilling applications comprising coating the interior of a deflector shoe with at least one lubricant. In an embodiment, the method includes the applying a wet lubricant to a wellbore and to the interior of the deflector shoe, wherein the wet lubricant is a liquid mixed with a friction reducer. The step of the coating may also include applying a dry lubricant on the interior of the deflector shoe, hardening the applied dry lubricant, and applying a wet lubricant over the hardened dry lubricant.

In an embodiment, the method further includes the steps of coating a hose and/or a jet nozzle with at least one lubricant and passing the hose and/or jet nozzle through the coated interior of the deflector shoe.

In an embodiment, the step of coating comprises coating contact surfaces between the deflector shoe and the hose and/or jet nozzle.

In an embodiment, the method further includes the steps of coating components of a milling cutter with at least one lubricant and passing the coated components of the milling cutter through the coated interior of the deflector shoe.

In an embodiment, the lubricant is selected from a group consisting of: tire shine, fluoropolymer coatings, tungsten disulfide coating, Never Seez® (anti-seize compound), polytetrafluoroethylene, molybdenum disulfide, graphite, silicone, and epoxy.

In an embodiment, the method further includes the step of roughening the interior of the deflector shoe prior to the step of coating. The roughening may be accomplished by sanding the interior of the deflector shoe with sandpaper or by dimpling the surface in another manner.

The present invention is also a method for reducing friction in a radial drilling application, the method comprising: roughening an interior of a deflector shoe; coating the interior of the deflector shoe with at least one lubricant; passing a hose through the coated interior of the deflector shoe; and applying a wet lubricant to the deflector shoe during the step of passing.

In an embodiment, the at least one lubricant applied to the deflector shoe includes a hardened dry lubricant with a wet lubricant layer over the hardened dry lubricant.

In an embodiment, the method further includes the step of coating an exterior of the hose with at least one lubricant prior to the step of passing.

In an embodiment, the method further includes the step of coating a jet nozzle with at least one lubricant; and passing jet nozzle through the coated interior of the deflector shoe.

In an embodiment, the method further includes the step of coating components of a milling cutter with at least one lubricant; and passing the components of the milling cutter through the coated interior of the deflector shoe.

The at least one lubricant may be selected from a group consisting of: tire shine, fluoropolymer coatings, tungsten disulfide coating, polytetrafluoroethylene, molybdenum disulfide, graphite, silicone, epoxy and Never Seez® (anti-seize compound).

In an embodiment, the step of applying a wet lubricant is continuous during a drilling process, wherein the wet lubricant is a liquid mixed with a friction reducer.

The present invention is also an apparatus for reducing friction in radial drilling applications. The apparatus includes a deflector shoe having an interior surface; and at least one lubricant applied to the interior surface of the deflector shoe. In an embodiment, the interior surface of the deflector shoe is roughened prior to application of the at least one lubricant. In an embodiment, the at least one lubricant is a wet lubricant. In another embodiment, the at least one lubricant is a dry lubricant. In a preferred embodiment, the at least one lubricant is a hardened dry lubricant with a wet lubricant layer over the hardened dry lubricant. The at least one lubricant may be selected from a group consisting of tire shine, fluoropolymer coatings, tungsten disulfide coating, polytetrafluoroethylene, molybdenum disulfide, graphite, silicone, epoxy and Never Seez® (anti-seize compound).

This foregoing Section is intended to describe, with particularity, the preferred embodiments of the present invention. It is understood that modifications to this preferred embodiment can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 1:
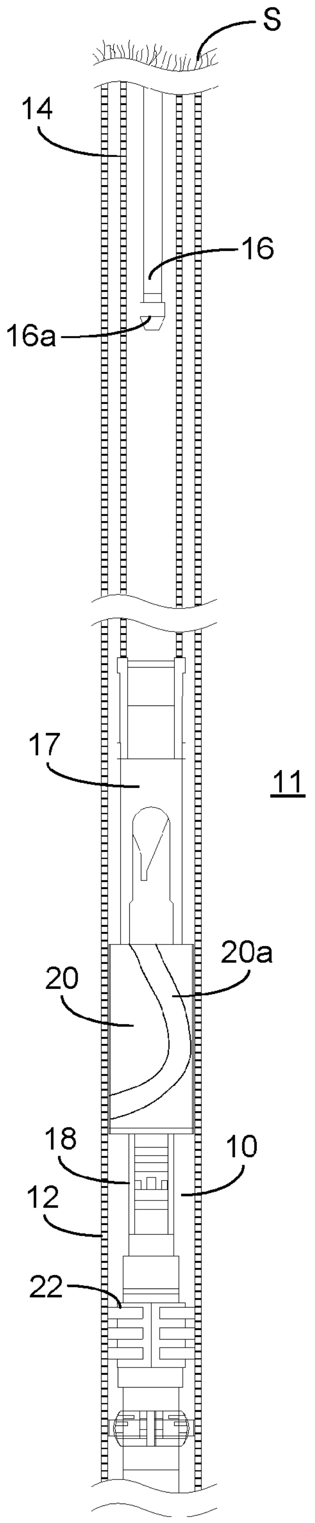
FIG. 1 PRIOR ART
FIG. 1 is a schematic illustration showing a prior art indexing deflector assembly having a deflector shoe.
Figure 2:
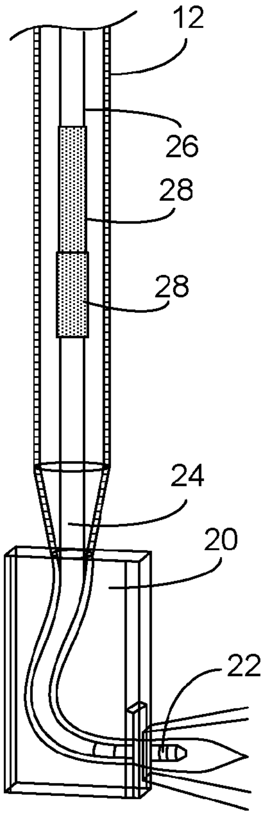
FIG. 2 PRIOR ART
FIG. 2 is a schematic illustration of a jet drilling process illustrating a jet nozzle passed through a deflector shoe.
Figure 3:
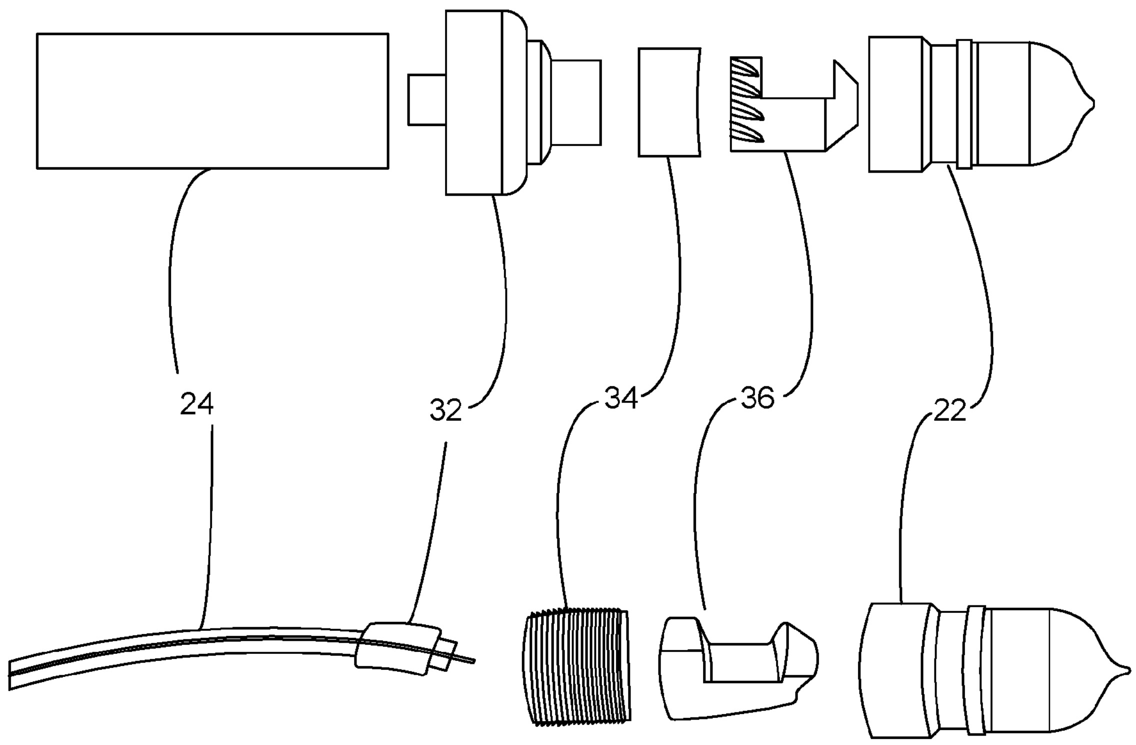
FIG. 3 PRIOR ART
FIG. 3 is an example of the prior art thumper nozzle subassembly as used in radial jet drilling operations.
Figure 4:
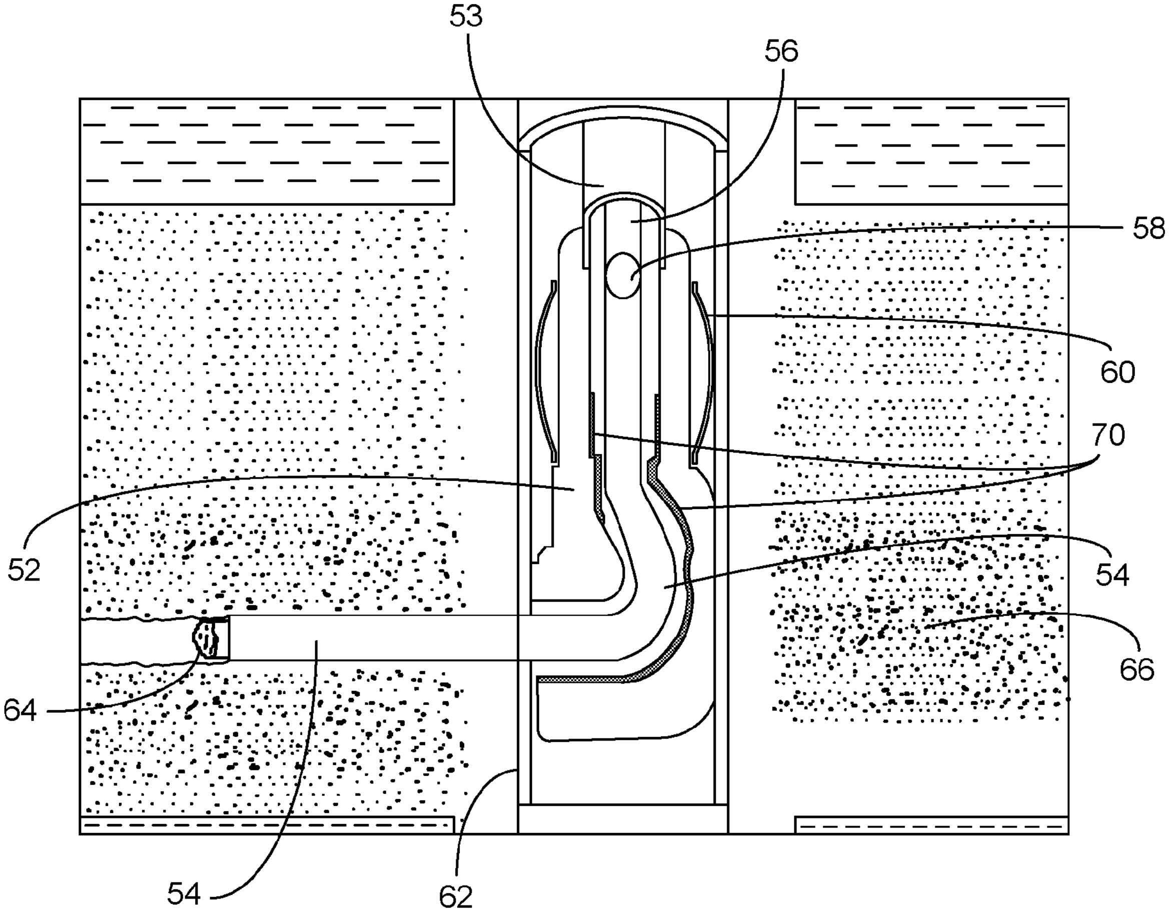
FIG. 4 illustrates the method and system of the present invention.

Referring to FIG. 4, there is shown an illustration of the system and method of the present invention. A deflector shoe 52 is associated with the casing 62 of a wellbore. The deflector shoe 52 has an interior through which a flexible hose 54 is moved. The flexible hose 54 has a jet nozzle 64 at an end thereof. FIG. 4 also illustrates work tubing 53 having a coil tubing 56 therein. This is connected by connector 58 to the flexible hose 54. Also illustrated in FIG. 4 is a centralizer 60 which serves to position the deflector shoe within the casing 62.

The interior of the deflector shoe 52 is provided with a lubricant coating 70. As can be seen in FIG. 4, the lubricant coating 70 is provided on the interior surface of the deflecting shoe 52, and is importantly provided at contact surfaces between the flexible hose 54, jet nozzle 64 and the interior of the deflector shoe 52. The lubricant coating 70 can include be wet lubricant or a dry lubricant, or a combination of the two.

In the case of a wet lubricant, the lubricant coating 70 can be applied manually by a worker onsite or in the field. In the case of a dry lubricant, the lubricant coating is preferably sprayed or otherwise manually applied on the interior of the deflector shoe 52.

As used herein, the term "wet lubricant" can be any lubricant which remains in a wet, liquid or non-hardened state. For example, wet lubricants include less viscous lubricants such as water, and relatively highly viscous liquids such as those having a grease or paste consistency. Wet lubricants can also be combinations of wet lubricants, such as water or other liquid having a friction reducer introduced into the water. The friction reducer can be a polyacrylamide-based polymer.

The term "dry lubricant" includes those lubricants which harden by heat treatment or by the nature of the lubricant. In the hardened state, these dry lubricants result in a surface having a lower coefficient of friction than the bare metal of the deflector shoe or other equipment. The dry lubricant can be applied to the equipment, and heat-treated or otherwise allowed to harden before introduction into the wellbore, resulting in the lubricant remaining on the equipment during operations.

In the present invention, the flexible hose 54 and jet 64 may also be coated with the same or another lubricant coating so as to further reduce friction between the components. It is also within the concept of the present invention that the components of a milling cutter can be coated with a lubricant before passing through the lubricated deflector shoe 52.

In a preferred embodiment of the present invention, both the wellbore (casing 62) and drilling equipment (i.e. the flexible hose 54, jet 64 and the milling cutter) are lubricated. A wet lubricant is applied to the drilling hole from the surface. The wet lubricant applied to the drilling hole is preferably a liquid (brines or water, for example) containing powders, and is applied continuously during drilling operations. The wet lubricant may also include a friction reducer added to the liquid treatment fluid, which is continuously pumped into the wellbore.

In an embodiment, the dry lubricant is applied to the drilling equipment and deflector shoe, ensuring full coverage of the surfaces. Either epoxy-based and spray coated lubricants can be applied. Once the dry lubricant is hardened, a wet lubricant (such as a grease-type lubricant) is preferably applied over the hardened dry lubricant. This additional coating of lubricant was found to result in the lubricants remaining on the equipment for a longer period of time.

A number of different commercially available lubricants may be utilized in the system and method of the present invention, including tire shine, fluoropolymer coatings, tungsten disulfide coating, polytetrafluoroethylene, molybdenum disulfide, graphite, silicone, epoxy and Never Seez® (anti-seize compound). Commercially-available lubricants may also be modified by adding substances so as to increase lubricity.

Tire shine is a range of products which use specialized polymer technology to create a gloss finish on the tire surface. Such polymer compounds are formulated to not only make tires look good (due to the gloss finish) but also to protect them from harmful UV rays, grime and other contaminants picked up on road surfaces. Typically, tire shine is a silicon-based lubricant.

The Never-Seez® product line (by BOSTIK) covers a range of anti-seize compounds to meet a wide range of anti-seize, anti-galling, and lubrication applications. Special greases are entrained with specific particulates (predominantly metallic) to protect parts even in high-temperature, high-pressure and corrosive environments, allowing parts to work longer with less wear. Not all compounds are appropriate to every application. The Never-Seez® anti-seize compound and lubricant is known to contain graphite, copper flake, aluminum powder and zinc oxide.

Experimentation by the inventors found that treatment with lubricants at the contact surfaces between the hose and the deflector shoe helped greatly decrease the force required to pull the hose through the deflector shoe. This, in turn, decreased the required propulsion force needed from the nozzle to pull the hose and the required flow rate to the nozzle itself. It was discovered that with the maximum force required to pull a 5600 p.s.i. pressurized hose through the deflector shoe reduced by 65%, from 25 lbft for the dry hose to 8 lbft for a tire shine or oil coated hose through a Never Seez® (anti-seize compound) coated shoe Experiments utilizing a combination of wet lubricants were conducted by the inventors, and are detailed below. First, a pull through shoe test was conducted. Specifically, this tested the force required to pull a pressurized hose through a shoe having different surface conditions. This test was performed to analyze how much force was required to pull a hose through a deflector shoe by varying the magnitude of the pressure with different surface conditions. The hose was laid between two steel deflector shoe pieces. The hose was pulled out at continuous rate and the maximum required force was recorded. The test was conducted with various hose conditions (1) dry hose, (2) hose wet with water, (3) dry hose through shoe pieces coated with commercially-available lubricant, and (4) oily hose through shoe pieces coated with commercially-available lubricant. A commercially-available hose was utilized. In this test, the commercially-available lubricant was Never Seez® (anti-seize compound).

Figure 5:
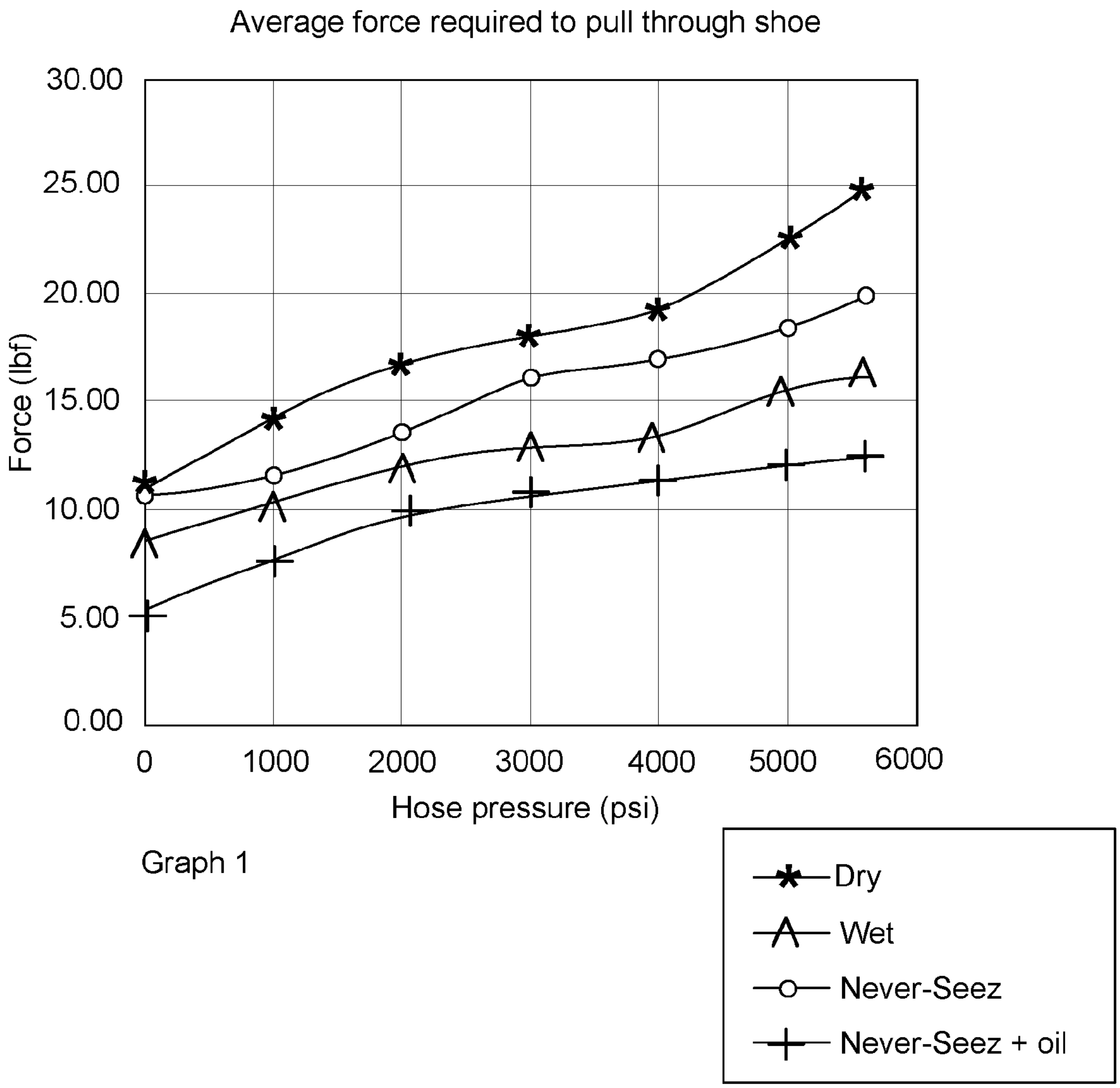
FIG. 5 shows Graph 1, wherein tests results show that as the inner pressure of the hose increases, the force required to pull the hose through the shoe increases.

The results of the tests are shown in Graph 1 (see FIG. 5). Graph 1 illustrates that as the inner pressure of the hose increases, the force required to pull the hose through the shoe increases. The maximum applied hose pressure was 5600 p.s.i. However, by lubricating the surface of the hose, the required pull force decreases about 50% from a dry hose to an oily hose and a shoe coated with commercially-available lubricant.

Figure 6:
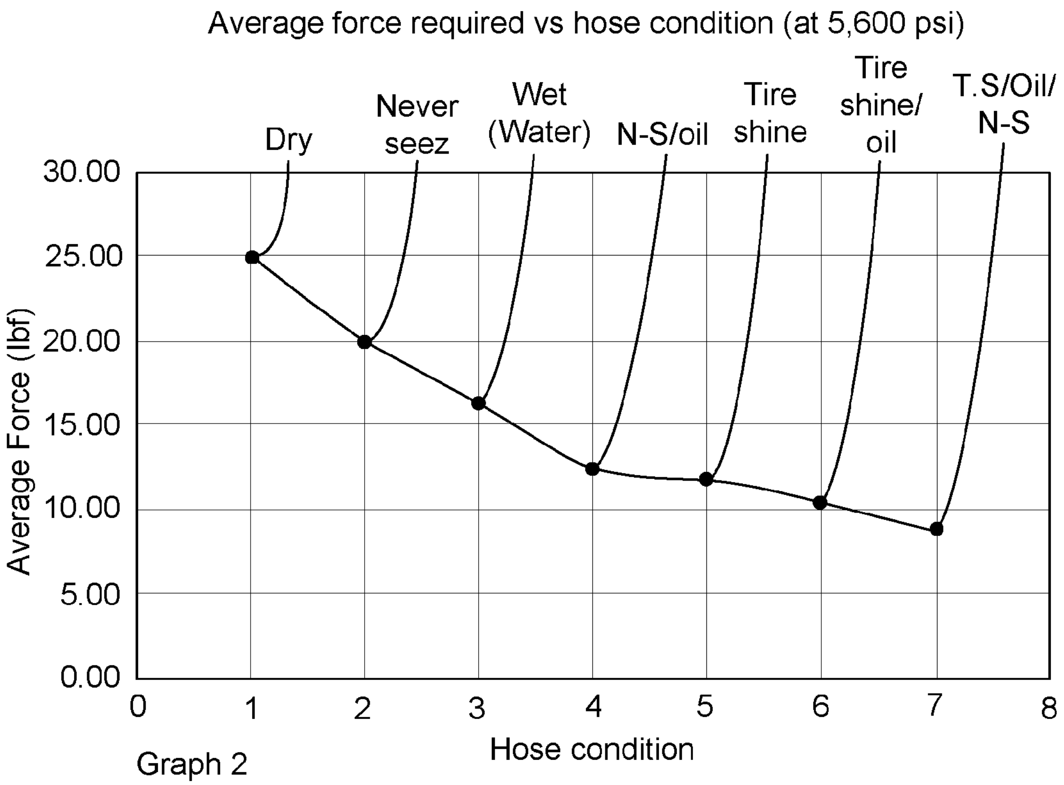
FIG. 6 shows Graph 2 wherein test results illustrate how the force required changes depending on different coating of the hose.

By reducing the friction on the hose, effectively more force can be transmitted. Further experiments were conducted with different coatings. The Graph 2 (see FIG. 6) illustrates three additional conditions, namely (5) tire shine-coated hose through deflector shoe, (6) tire shine/oil coated hose through deflector shoe, and (7) tire shine/oil coated hose through Never Seez® (anti-seize compound) coated shoe. It was discovered that the maximum required force to pull a 5600 p.s.i. hose through the deflector shoe drops from 8.4 lbft for tires for condition (7), namely tire shine/oil coated hose through Never Seez® (anti-seize compound) coated could shoe.

Figure 7:
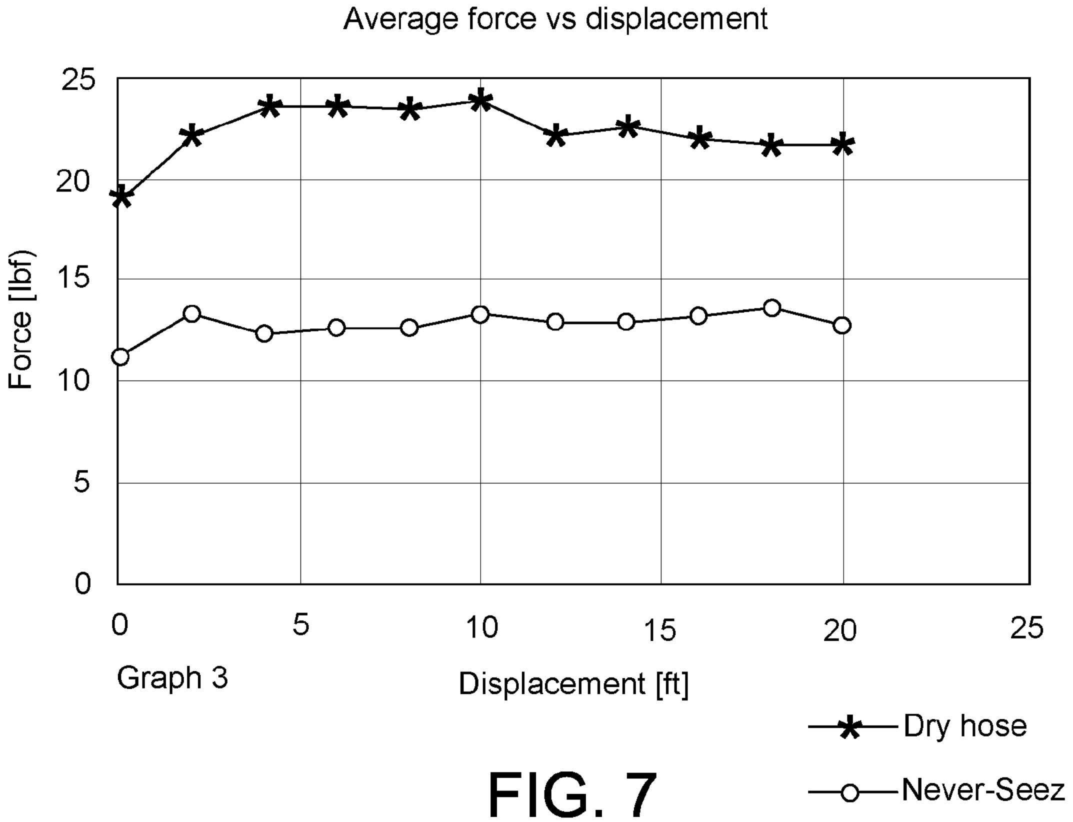
FIG. 7 shows Graph 3, wherein test results are provided when the hose is coated with Never Seez® (anti-seize compound).

Coating the hose with Never Seez® (anti-seize compound) also resulted in differences in the average force required to pull a hose through the deflector shoe, as is illustrated in Graph 3 (see FIG. 7).

The experiments detailed above were conducted using a wet lubricant, which can be manually applied. Further experimentation shows that a dry lubricant would also be likely to adhere to the interior of the deflector shoe over time, maintaining a reduced friction. These dry lubricants may be sprayed on or otherwise manually applied and allowed to dry and/or heat treated, and can also be used for longer periods of time. The inventors expect similar or better results from the dry lubricant in terms of differences in pulling force.

Figure 8A:
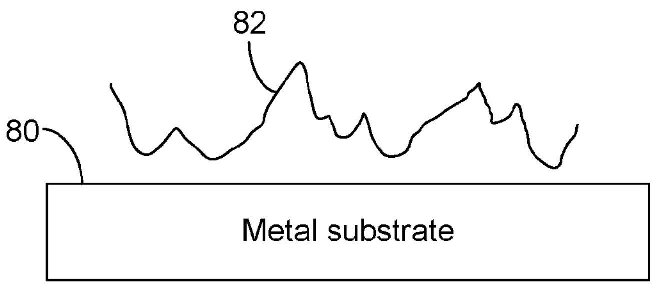
FIGS. 8A and 8B illustrate, at a microscopic level, the interface between the surfaces of the hose and the deflector shoe.
Figure 8B:
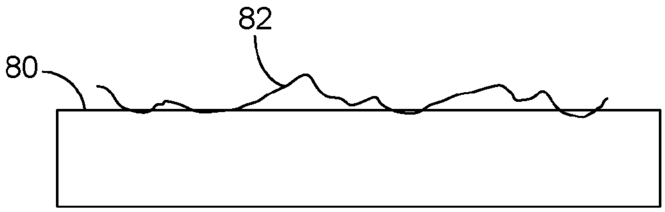

The present invention may also include a step of roughening of the surface of the deflector shoe 52, or in the case of an apparatus or system, providing a roughened deflector shoe 62. FIG. 8A illustrates, at a microscopic level, the interface between the metallic surface 80 of the deflector shoe 62 and the irregular surface 82 of the rubber hose. FIG. 8B illustrates the interface when the hose is tensioned and pressurized. In FIG. 8B, it can be seen how the flattened hose surface 82 abuts the metallic surface 80, which may generate vacuum between the surfaces and induces higher drag. The vacuum is generated between points of contact between the hose and the metallic surface 80. Higher drag may also be caused by increased area of contact between surfaces As a solution to this problem, in the present invention, the originally smooth and shiny metallic surface of the deflector shoe may be roughened prior to installation and coating with the lubricant. The roughening can be accomplished in a number of ways, including sanding with various grades of sandpaper. The roughened surface 80 may be created by dimpling the surface in another manner.

Figure 8C:
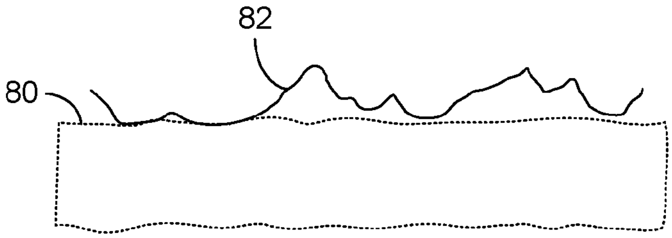
FIG. 8C illustrates the interface between the surfaces of the hose and deflector shoe when the surfaces have been lubricated and the deflector shoe surface has been roughened.

The resulting roughened surface 80 is illustrated in FIG. 8C. As can be seen, the effect of the roughened surface 80 is to create channels to release air or fluid, and thus the vacuum. This was found to reduce drag on the hose. The wet and/or dry lubricants applied to the stiff hose reduces deformation, while the wet lubricant applied to the wellbore further reduces hose deformation and friction between the surfaces. The roughened surface 80 also results in an enhanced application and retention of the lubricant.

The method and system of the present invention allows for greatly reduced friction between drilling components and the deflector shoe. This, in turn, increases the useful life of the components associated with these operations. Additionally, the reduced friction allows for a reduction in the power requirements of equipment used to run the tools in the drilling operations, contributing to a reduction in costs association with these operations.

The foregoing disclosure and description of the invention is illustrative and explanatory thereof. Various changes in the details of the illustrated construction can be made is the scope of the present invention without departing from the true spirit of the invention.

We claim:

1. An apparatus for reducing friction in a radial drilling application, the apparatus comprising:
- a deflector shoe having an interior surface;
- a dry lubricant applied to the interior surface of the deflector shoe; and
- a wet lubricant applied over the dry lubricant, the wet lubricant having a paste or grease consistency;
- wherein the dry lubricant is selected from a group consisting of: fluoropolymer coatings, tungsten disulfide coating, polytetrafluoroethylene, molybdenum disulfide, graphite, silicone and epoxy;
- wherein the wet lubricant is selected from a group consisting of: anti-seize compound and tire shine.

2. The apparatus of claim 1, wherein the interior surface of the deflector shoe is roughened prior to application of the dry lubricant.

* * * * *